United States Patent Office 3,646,133
Patented Feb. 29, 1972

3,646,133
ANHYDRIDES OF ORGANO-ALKYLIDENE
PHOSPHONYL PHOSPHINE OXIDES
Al F. Kerst, Denver, Colo., assignor to
Monsanto Company, St. Louis, Mo.
No Drawing. Filed June 11, 1969, Ser. No. 832,491
Int. Cl. C07d 105/02
U.S. Cl. 260—545 P     2 Claims

ABSTRACT OF THE DISCLOSURE

This invention covers anhydrides of organo (alkylidene phosphonyl) phosphine oxides such as tris(alkylidene phosphonyl) phosphine oxide anhydride having the formula

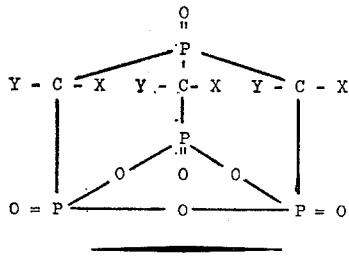

This invention relates to anhydrides of organo-phosphine oxides and, more particularly, to anhydrides of organo-alkylidene phosphonyl phosphine oxides, particularly anhydrides of organo-poly(alkylidene phosphonyl) phosphine oxides, and processes for preparing the same.

An object of this invention is to provide new and useful anhydrides of organo-alkylidene phosphonyl phosphine oxides containing at least one anhydride group per molecule.

Another object of this invention is to provide new and useful anhydrides of organo-poly(alkylidene phosphonyl) phosphine oxides containing at least one anhydride group per molecule.

A further object of this invention is to provide a process for preparing anhydrides of organo-alkylidene phosphonyl phosphine oxides.

Other objects of this invention will be apparent from a reading of the following description.

This invention is directed to new and useful anhydrides of organo-alkylidene phosphonyl phosphine oxides having the formula:

(I) $R_n'-\overset{O}{\underset{\|}{P}} \left( -\underset{Y}{\overset{X}{\underset{|}{C}}} - P = (OH)_2 \right)_{3-n}$ wherein: $n$ is an integer 0 to 2, X and Y are selected from the group consisting of hydrogen and alkyl groups containing from 1 to 6 carbon atoms, and R is selected from the group consisting of hydrogen, aliphatic, aryl, alkaryl, aralkyl, alicyclic, and

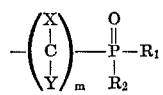

wherein: $m$ is an integer from 1 to 10, and $R_1$ and $R_2$ are each selected from the group consisting of hydrogen, alkyl groups containing from 1 to 6 carbon atoms,

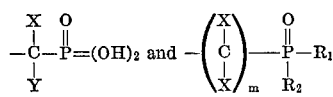

and R does not contain over 6

groups, i.e. phosphine oxide moieties in the straight chain, for example

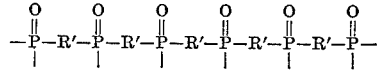

where R' is an organic group either substituted or unsubstituted.

As used herein, the term "anhydride(s) of organo-alkylidene phosphonyl phosphine oxide(s)" generically describes all of the foregoing. Anhydrides of organo-alkylidene phosphonyl-phosphine oxide can be generally characterized by containing at least one anhydride (P—O—P) group per molecule. Additionally, the preferred phosphine oxides anhydrides of the present invention are those wherein $n$ of the above phosphine oxides of Formula I is an integer 0 to 1 and are generically described herein as "anhydride(s) of organo-alkylidene-polyphosphonyl phosphine oxide(s)."

In the foregoing general formula, although X and Y are preferably hydrogen, when X and Y represent alkyl groups, the groups may be branched or straight chained and when R represents aliphatic groups, the groups may be branched or straight chained as well as being saturated (alkyl) or unsaturated although it is preferred that if the groups are unsaturated they be ethylenically unsaturated and especially preferred are mono-ethylenically unsaturated groups (alkenyl). Additionally, when R represents groups containing alkyl moieties, i.e., aralkyl groups and the like, such carbon chains may be of a straight chain structure or branched chain structure and it is preferred that such contain from 1 to about 20 carbon atoms. When R represents alicyclic groups such are preferably 5 and 6 membered mono-cyclic alicyclic groups (cyclopentyl and cyclohexyl). When R represents aryl groups or groups containing aryl moieties, i.e., alkaryl groups and the like, such groups are preferably mono-cyclic or di-cyclic groups containing from 6 to 10 carbon atoms and especially preferred is the mono-cyclic group containing 6 carbon atoms (phenyl). In addition, the foregoing mentioned hydrocarbyl groups may contain substituent groups, such as, halides (fluoride, chloride, bromide and iodide), alkoxy groups, sulfonyl groups, and the like. Although the hydrocarbyl groups can contain a plurality of such substituent groups, it is preferred that they contain only one such substituent group per hydrocarbyl group. For most end use applications, the compounds of the instant invention should preferably contain not more than about 25 carbon atoms associated with R, $R_1$, $R_2$ and X, and there are few, if any, end uses in which these groups contain more than a total of 50 carbon atoms.

In conjunction with the definitions of R, $R_1$ and $R_2$ above, the preferred organic substituents are the following:

(a) alkyl—containing from about 1 to about 18 carbon atoms;
(b) alkenyl—containing from about 1 to about 18 carbon atoms;
(c) aryl—phenyl, naphthyl, anthryl or phenanthryl;
(d) alkyl aryl (alkaryl)—hydroxy, halogen, lower alkyl, having from 1 to about 6 carbon atoms, and amino substituted phenyl, naphthyl, anthryl, or phenanthryl;
(e) cyclic—containing from about 4 to about 8 carbon atoms and there may be present in the ring either a nitrogen, sulfur, oxygen, or phosphorus atom; and
(f) alicyclic—containing from about 4 to about 10 carbon atoms.

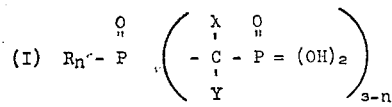

In general, the anhydrides of organo-alkylidene phosphonyl phosphine oxides can be prepared by the process of reacting an organo-phosphonyl-phosphine oxide with a suitable derivative of an organic carboxylic acid. Suitable organic carboxylic acid derivatives include organic carboxylic anhydrides and/or organic carboxylic acid halides. Such organic carboxylic acid derivatives can be characterized by having the following formula:

(II) 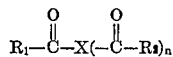

wherein X is a member selected from the group consisting of halogens (preferably chlorine and bromide) and oxygen, $n$ is 0 when X is a halogen and 1 when X is oxygen and $R_1$ and $R_2$ are each a lower aliphatic group containing from 1 to about 6 carbon atoms. Although $R_1$ and $R_2$ can represent unsaturated hydrocarbonyl groups such as ethylenically unsaturated hydrocarbyl group (alkenyl) and the like, it is preferred that they be an alkyl group.

Suitable organic carboxylic anhydrides include acetic anhydride, perfluoropropionic anhydride, perfluoro-n-butyric anhydride, propionic anhydride, trimethyl acetic anhydride isobutyric anhydride, perfluoro-n-caproic anhydride, dichloroacetic anhydride, isovaleric anhydride and the like with acetic anhydride being preferred.

Suitable organic carboxylic acid halides include acetyl chloride, fluoroacetyl chloride, acrylyl chloride, propionyl chloride, isobutyryl chlorine, methaacrylyl chloride, vinyl acetyl chloride, n-butyryl chloride, diethyl acetyl chloride, iso-valeryl chloride, allyl acetyl chloride, acetyl bromide, propionyl bromide, chloroacetyl bromide, n-butyryl bromide, iso-valeryl bromide, trichloroacetyl bromide, bromoacetyl bromide and the like with acetyl chloride being preferred.

In general, the reaction can be carried out by heating the reactants, that is, an organo-alkylidene-phosphonyl phosphine oxide or mixtures of such oxides and an organic carboxylic anhydride or acid halide or mixtures of such anhydrides and/or acid halides, preferably under agitation or stirring, for a time sufficient to prepare the desired products, that is, an anhydride of an organoalkylidene-phosphonyl phosphine oxide or a mixture of such anhydrides. The reaction for forming an anhydride linkage apparently proceeds with water being split off from two phosphonic acid groups thus forming the desired anhydride linkage (P—O—P) and an organic carboxylic acid, as, for example, according to the following equation using a carboxylic anhydride as a reactant:

(I) 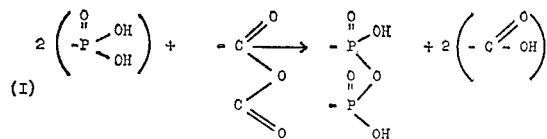

A distinct advantage of the process is the relative insolubility which the organo-alkylidene polyphosphonyl-phosphine oxide anhydrides of the present invention have in the resulting organic carboxylic acid medium and thus such can be easily recovered from this medium by filtration, centrifuging, decantation and the like.

In general, it is preferred to use the organic carboxylic anhydride in the process of the present invention, since such can be used, if desired, without an inert non-aqueous reaction medium. When using an organic carboxylic acid chloride in the process of the present invention, it should preferably be used in an inert non-aqueous reaction medium, especially an organic carboxylic acid, although such mediums containing non-polar solvents can be used which include paraffin hydrocarbons, benzene, toluene, xylene, acetone and the like. When using a non-polar solvent as a reaction medium the phosphine oxide anhydride product can be recovered therefrom by distilling off the medium or precipitating the phosphine oxide anhydride product therefrom since, generally speaking, the phosphine oxide anhydride products exhibit limited solubility in most non-polar solvents.

It should be noted that it is possible to obtain full or complete phosphine oxide anhydrides from organo-alkylidene-polyphosphonyl-phosphine oxides, that is, all phosphonic groups of the molecule participate in phosphonic anhydride linkages, or partial anhydrides wherein the compounds contain phosphonic anhydride linkages as well as phosphonic acid groups. In addition, with some organo-alkylidene-phosphonyl-phosphine oxide starting materials, particularly those containing a mono-phosphonic acid group or the poly-phosphonyl-phosphine oxide in which a phosphonic group is sterically hindered or is not in close proximity to another phosphonic acid group in the compound, phosphonic anhydride formation, i.e., forming a P—O—P linkage, will occur between organo-alkylidene-phosphonyl-phosphine oxide compounds resulting in a degree of dimerization or polymerization.

Elevated temperature conditions are preferred for carrying out the process, such as from about 40° C. to the boiling point or melting point of the reactants (under atmospheric pressure, although sub-atmospheric pressures as well as pressures in excess of atmospheric can be used) with temperatures above about 90° C. (particularly reflux temperatures) being especially preferred. The reactants can be used in varying amounts depending upon such factors as the degree of anhydride formation desired, particular reactants, temperature conditions and the like. Generally, at least about 0.1 of a mole of organic carboxylic derivative is necessary per mole of organo-alkylidene-phosphonyl phosphine oxide reactant in order to obtain at least some degree of anhydride formation in such phosphine oxide. For complete anhydride formation of organo-alkylidene-polyphosphonyl phosphine oxides, however, it is usually necessary to use at least about 1 mole of organic carboxylic derivative per phosphonic acid group in the organo-alkylidene-polyphosphonyl phosphine oxide. It is preferred in all cases to use excess amounts of the organic carboxylic derivative, that is, amounts above about 1 mole of starting carboxylic derivative per phosphonic acid group in the starting organo-phosphonyl phosphine oxides, and excess amounts of the starting carboxylic derivative of from about 10% to 100% are preferred although amounts in excess of 100% can be used but such amounts do not, in most cases, appear advantageous.

The organo-alkylidene-phosphonyl phosphine oxides useful as starting materials to prepare the compounds of the instant invention are known in the art as exemplified by the articles set forth in Angew Chem., internat. Edit., volume 7—No. 5, pages 384–386 and which articles are incorporated herein by reference. For example, bis(phosphonylmethyl)alkyl phosphine oxides [also named alkyl bis(methylphosphenyl)phosphine oxides] can be prepared by the following reactions:

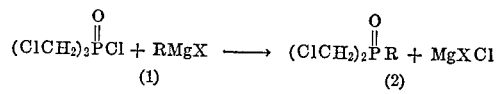

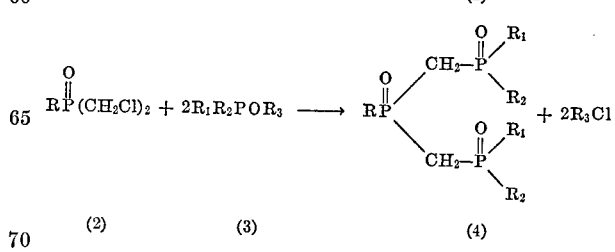

The phosphine oxide esters of Formula 4 are then converted to the acids per se by hydrolysis thereof with concentrated HCl. Specific examples of R, $R_1$ and $R_2$, in conjunction with the preparation of said esters of Formula 4, are listed below:

| | R | R₁ | R₂ |
|---|---|---|---|
| (a) | CH₃ | C₂H₅O | C₂H₅O |
| (b) | C₂H₅ | C₂H₅O | C₂H₅O |
| (c) | C₁₂H₂₅ | C₂H₅O | C₂H₅O |
| (d) | C₁₂H₂₅ | C₄H₉O | C₆H₅ |
| (e) | C₁₂H₂₅ | C₆H₅ | C₆H₅ |

The tris(phosphenylmethyl) phosphine oxides are prepared, for example, by the following reactions:

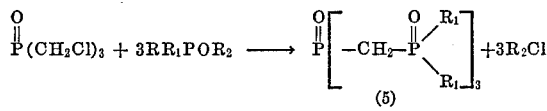

The tris(phosphenylmethyl) phosphine oxides are preverted to the acids per se by hydrolysis thereof by refluxing with concentrated HCl as well as thermal decomposition. Specific examples of R and R₁, in conjunction with the preparation of said esters of Formula 5, are listed below:

| | R | R₁ |
|---|---|---|
| (a) | CH₃O | CH₃O |
| (b) | C₂H₅O | C₂H₅O |
| (c) | Iso-C₃H₇O | Iso-C₃H₇O |
| (d) | n-C₄H₉O | n-C₄H₉O |
| (e) | 2-ethyl-hexyl-O- | 2-ethyl-hexyl-O- |
| (f) | C₄H₉O | C₆H₅ |
| (g) | C₆H₅ | C₆H₅ |

Particularly preferred anhydride compounds of the present invention include the tri(lower alkylidenephosphonyl) phosphine oxide anhydrides, that is, anhydrides of tri(lower alkylidenephosphonyl) phosphine oxides having the formula:

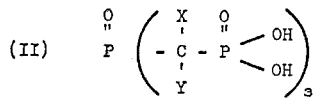

wherein X and Y are selected from the group consisting of hydrogen and alkyl groups containing from 1 to 6 carbon atoms.

A complete or full anhydride of a tri(lower alkylidenephosphonyl) phosphine oxide of Formula II above is believed to have the following structure:

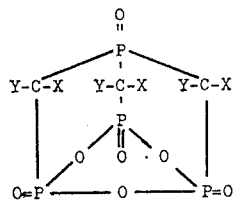

Particularly preferred anhydride compounds of the present invention include the alkyl di(lower alkylidenephosphonyl) phosphine oxide anhydrides, that is, anhydrides of alkyl di(lower alkylidenephosphonyl) phosphine oxides having the formula:

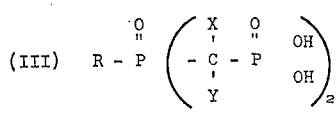

wherein: X and Y are selected from the group consisting of hydrogen and alkyl groups containing from 1 to 6 carbon atoms and R is an alkyl group containing from 1 to 20 carbon atoms.

Particularly preferred anhydride compounds of the present invention include the tetra(methyl phosphonyl) alkylene bis(phosphine oxide) anhydrides, that is, anhydrides of tetra-(methylphosphonyl) alkylene bis(phosphine oxide) having the formula:

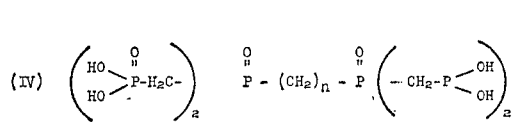

wherein: $n$ is an integer from 1 to 10 inclusive.

The anhydrides of organo-alkylidene-phosphonyl phosphine oxides exhibit several unique and/or distinctive properties which include a distinct increase, usually greater than 5° C. and in some cases greater than 50 to 150° C. or more, in the melting point (which may in some instances be a decomposition point) for the anhydride of a particular organo-alkylidenephosphonyl phosphine oxide over the corresponding organo-alkylidene phosphonyl phosphine oxide as well as a rate of reversion to the corresponding organo-alkylidene phosphonyl phosphine oxide of greater than about 1 gram per hour when 10 grams of an anhydride of an organo-alkylidene-phosphonyl phosphine oxide is slurried in 100 cc. of water for 1 hour at about 35° C.

In general, the anhydrides of organo-alkylidene-phosphonyl phosphine oxide of the present invention have utility in practically all fields wherein their alkylidene phosphonyl phosphine oxide anhydride properties can be utilized as well as fields employing an aqueous medium wherein they, by reversion to their corresponding organo-alkylidene-phosphonyl phosphine oxide have the same utility as such alkylidene phosphonyl phosphine oxides.

In particular, the compounds of the present invention have utility in such fields as sequestering or chelating agents, water-treating agents (including use in "threshold amounts"), stabilizers for peroxy compounds, soap antioxidants, additives in liquid soap, detergents and shampoos, agents for use in scouring wool cloth and cotton kier boiling, metal cleaning compositions, rubber and plastic compositions and polymerization processes, bottle washing compositions, dairy cleaning compositions, agents for use in pulp and paper processing, corrosion inhibitors, feed and vegetation supplements, herbicides, insecticides, metal treating compositions, electroplating, detergent builders for organic surfactant actives, lime soap dispersants, surfactants, film formers in hair sprays and soluble packages, dispersants for clays, drilling muds, paper pulps, inorganic and organic pigments, and cement slurries, bactericide potentiators, hair modifiers in shampoos, fertilizers, food and beverage acidulants, leavening agents, cheese emulsifiers, modifying agents in evaporated and condensed milk, flame retardants in paints, oil additives, gasoline additives, dentifrice compositions and the like.

In addition to the end-use applications set forth immediately above, the anhydrides of the present invention represent new, unique organo phosphorus structures which are high in phosphorus content and which also can function as chemical intermediates in order to prepare other materials. In other words, the present invention phosphine oxide anhydrides react readily with alcohols, phenols and amines to form esters and amides. Furthermore, these anhydrides react with diols and diamines to form high molecular weight phosphorus-containing polyols and polyamines or to form polymers In other words these phosphine oxide anhydrides will combine with a wide variety of substances containing any form of hydroxyl or amino group, such as in cellulose (for example paper, textiles, wood and the like), polymeric alcohols, polymeric amines and other polymers.

Some of the typical reactions of the present invention phosphine oxide anhydrides, for example, the full anhydride of tris(methyl phosphonyl) phosphine oxide are shown below:

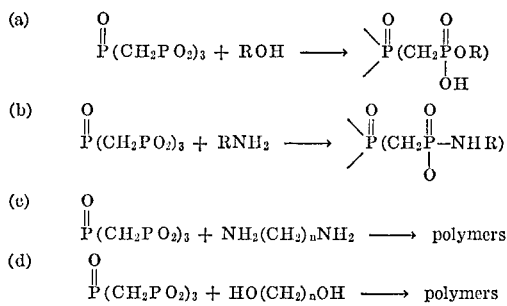

The following examples are presented to illustrate the invention, with parts and percentages by weight being used in the examples unless oherwise indicated.

EXAMPLE 1

Into a suitable reaction vessel equipped with an agitator, thermometer and reflux condenser, are charged about 32 parts of tri(methylphosphonyl) phosphine oxide, also known as tris(phosphonyl methyl) phosphine oxide, and 61 parts of acetic anhydride. The reaction mixture is stirred so as to achieve a good dispersion of the acid in the acetic anhydride and then heated at reflux temperatures for about 3½ hours under stirring. The initial reflux is at about 135° C. and gradually drops to about 125° C. as the concentration of by-product acetic acid increases. The reaction batch is cooled to room temperature and then filtered, obtaining the product as filter cake. The cake is washed with diethyl ether or acetone and then dried yielding about 25 parts of an anhydride of tri(methyl-phosphonyl)phosphine oxide, $$P(O)(CH_2)_3P_3O_6$$

a light tan crystalline product melting in the range of 350–400° C. (d) as compared to a melting point of 200–210° C. (d) for crystalline tri(methyl-phosphonyl) phosphine oxide.

EXAMPLE 2

Into a suitable reaction vessel such as described in Example 1 above, are charged about 78 parts of dodecyl di(methylphosphonyl) phosphine oxide and about 164 parts of acetic anhydride. The reaction mixture is stirred so as to achieve a good dispersion of the acid in the acetic anhydride and then heated at reflux temperatures (about 125–135° C.) for about 3 hours under stirring. The reaction batch is cooled to room temperature and then filtered, obtaining the product as filter cake. The cake is washed with diethyl ether or acetone and then dried yielding about 64 parts of an anhydride of dodecyl di(methylphosphonyl) phosphine oxide, $$C_{12}H_{25}P(O)(CH_2)_2P_2O_4$$

a crystalline product melting in the range of about 261° C.–269° C. (d) as compared to a melting point of 208–220° C. (d) for dodecyl di(methylphosphonyl) phosphine oxide.

EXAMPLE 3

Into a suitable reaction vessel such as described in Example 1 above, are charged about 28 parts of pentamethylene tetra(methylphosphonyl) bis(phosphine oxide), and about 82 parts of acetic anhydride. The reaction mixture is stirred so as to achieve a good dispersion of the phosphine oxide in the acetic anhydride and then heated at reflux temperatures (about 125–135° C.) for about 3½ hours under stirring. The reaction batch is cooled to room temperature and then filtered, obtaining the product as filter cake. The cake is washed with diethyl ether or acetone and then dried yielding about 22 parts of an anhydride of pentamethylene tetra(methylphosphonyl(bis(phosphine oxide), a crystalline product exhibiting a melting point of about 221° C. (d) as compared to a melting point of about 156° C. (d) for the parent acid, pentamethylene tetra(methylphosphonyl) bis(phosphine oxide). Only about half of the expected weight loss was obtained (as compared to the expected weight loss for complete anhydride formation) indicating only partial anhydride formation.

EXAMPLE 4

Into a suitable vessel such as described in Example 1 above, are charged about 34 parts of tri(ethylidenephosphonyl) phosphine oxide and about 80 parts of acetic anhydride. The reaction mixture is stirred so as to achieve a good dispersion of the acid in the acetic anhydride and then heated at temperatures of about 100–110° C. for about 10 hours under stirring. The reaction batch is cooled to room temperature and then filtered, obtaining the product as filter cake. The cake is washed with diethyl ether or acetone and then dried yielding an anhydride of tri(ethylidenephosphonyl) phosphine oxide.

EXAMPLE 5

Into a suitable vessel such as described in Example 1 above, are charged about 226 parts of methyl di(methylphosphonyl) phosphine oxide and about 280 parts of propionic anhydride. The reaction mixture is stirred so as to achieve a good dispersion of the acid in the anhydride and then heated at reflux temperatures (141–155° C.) for about 4 hours under stirring. The reaction batch is then cooled to room temperature and then filtered, obtaining the product as filter cake. The cake is washed with diethyl ether or acetone and then dried yielding an anhydride of methyl di(methylphosphonyl) phosphine oxide.

EXAMPLE 6

Into a suitable vessel such as described in Example 1 above, are charged about 360 parts of decyl(methylphosphonyl) phosphine oxide and about 250 parts of acetic anhydride. The reaction mixture is stirred so as to achieve a good dispersion of the acid in the anhydride and then heated at reflux temperatures (125–135° C.) for about 5½ hours under stirring. The reaction batch is cooled to room temperature and then filtered, obtaining the product as filter cake. The cake is washed with diethyl ether or acetone and then dried yielding an anhydride of decyl di(methylphosphonyl) phosphine oxide.

EXAMPLE 7

Into a suitable vessel such as described in Example 1 above, are charged about 440 parts of tetradecyl di(methylphosphonyl) phosphine oxide and about 271 parts of acetic anhydride. The reaction mixture is stirred so as to achieve a good dispersion of the acid in the anhydride and then heated at temperatures of about 95–100° C. for about 16 hours under stirring. The reaction batch is cooled to room temperature and then filtered, obtaining the product as filter cake. The cake is washed with diethyl ether or acetone and then dried yielding an anhydride of tetradecyl di(methylphosphonyl) phosphine oxide.

EXAMPLE 8

Into a suitable vessel such as described in Example 1 above, are charged about 370 parts of methyl di(butylidenephosphonyl) phosphine oxide and about 270 parts of acetic anhydride. The reaction mixture is stirred so as to achieve a good dispersion of the acid in the anhydride and then heated at reflux temperatures (125–135° C.) for about 6 hours under stirring. The reaction batch is cooled to room temperature and then filtered, obtaining the product as filter cake. The cake is washed with diethyl ether or acetone and then dried yielding an anhydride of methyl di(butylidenephosphonyl) phosphine oxide.

EXAMPLE 9

Into a suitable vessel such as described in Example 1 above, are charged about 560 parts of ethylene tetra(methylphosphonyl) bis(phosphine oxide) and about 450 parts of acetic anhydride. The reaction mixture is stirred so as to achieve a good dispersion of the acid in the anhydride and then heated at reflux temperatures (125–135° C.) for about 8 hours under stirring. The reaction batch is cooled to room temperature and then filtered, obtaining the product as filter cake. The cake is washed with diethyl ether or acetone and then dried yielding an anhydride of ethylene tetra(methylphosphonyl) phosphine oxide. From the weight loss of the anhydride only partial anhydride formation is indicated.

EXAMPLE 10

Into a suitable vessel such as described in Example 1, above, are charged about 250 parts of diethyl mono-(methylphosphonyl) phosphine oxide and about 240 parts of acetic anhydride. The reaction mixture is stirred so as to achieve a good dispersion of the acid in the anhydride and then heated at reflux temperatures (125–135° C.) for about 6 hours under stirring. The acetic acid and excess acetic anhydride are distilled off leaving a highly viscous product. The product is washed with diethyl ether or acetone and then dried yielding an anhydride of diethyl mono(methylphosphonyl) phosphine oxide which appears to be in a polymeric form.

EXAMPLE 11

Into a suitable vessel such as described in Example 1 above, are charged about 330 parts of phenyl di(methylphosphonyl) phosphine oxide and about 300 parts of acetic anhydride. The reaction mixture is stirred so as to achieve a good dispersion of the acid in the anhydride and then heated at reflux temperatures (125–135° C.) for about 4 hours under stirring. The reaction batch is cooled to room temperature and then filtered, obtaining the product as filter cake. The cake is washed with diethyl ether or acetone and then dried yielding an anhydride of phenyl di(methylphosphonyl) phosphine oxide.

EXAMPLE 12

Into a suitable vessel such as described in Example 1 above, are charged about 600 parts of butyric anhydride and about 340 parts of cyclohexyl di(methylphosphonyl) phosphine oxide. The reaction mixture is stirred so as to achieve a good dispersion of the acid in the anhydride and then heated at reflux temperatures (160–170° C.) for about 8 hours under stirring. The reaction batch is cooled to room temperature and then filtered, obtaining the product as filter cake. The cake is washed with diethyl ether or acetone and then dried yielding an anhydride of cyclohexyl di(methylphosphonyl) phosphine oxide.

EXAMPLE 13

Into a suitable vessel such as described in Example 1 above, are charged about 110 parts of cyclopentyl di-(methylphosphonyl) phosphine oxide and about 250 parts of acetic anhydride. The reaction mixture is stirred so as to achieve a good dispersion of the acid in the anhydride and then heated at reflux temperatures (125–135° C.) for about 6 hours under stirring. The reaction batch is cooled to room temperature and then filtered, obtaining the product as filter cake. The cake is washed with diethyl ether or acetone and then dried yielding an anhydride of cyclopentyl di(methylphosphonyl) phosphine oxide.

EXAMPLE 14

Into a suitable vessel such as described in Example 1 above, are charged about 380 parts of naphthyl di(methylphosphonyl) phosphine oxide and about 400 parts of acetic anhydride. The reaction mixture is stirred so as to achieve a good dispersion of the acid in the anhydride and then heated at reflux temperatures (125–135° C.) for about 8 hours under stirring. The reaction batch is cooled to room temperature and then filtered, obtaining the product as filter cake. The cake is washed with diethyl ether or acetone and then dried yielding an anhydride of naphthyl di(methylphosphonyl) phosphine oxide.

EXAMPLE 15

Into a suitable vessel such as described in Example 1 above, are charged about 560 parts of hexylphenyl di-(methylphosphonyl) phosphine oxide and about 420 parts of acetic anhydride. The reaction mixture is stirred so as to achieve a good dispersion of the acid in the anhydride and then heated at reflux temperatures (125–135° C.) for about 10 hours under stirring. The reaction batch is cooled to room temperature, then filtered, obtaining the product as filter cake. The cake is washed with diethyl ether or acetone and then dried yielding an anhydride of hexylphenyl di(methylphosphonyl) phosphine oxide.

EXAMPLE 16

Into a suitable vessel such as described in Example 1 above, are charged about 475 parts of dodecylphenyl di-(methylphosphonyl) phosphine oxide and about 280 parts of acetic anhydride. The reaction mixture is stirred so as to achieve a good dispersion of the acid in the anhydride and then heated at reflux temperatures (125–135° C.) for about 12 hours under stirring. The reaction batch is cooled to room temperature and then filtered, obtaining the product as filter cake. The cake is washed with diethyl ether or acetone and then dried yielding an anhydride of dodecylphenyl di(methylphosphonyl) phosphine oxide.

EXAMPLE 17

Into a suitable vessel such as described in Example 1 above, are charged about 368 parts of phenyloctyl di-(methylphosphonyl) phosphine oxide and about 250 parts of acetic anhydride. The reaction mixture is stirred so as to achieve a good dispersion of the acid in the anhydride and then heated at reflux temperatures (125–135° C.) for about 12 hours under stirring. The reaction batch is cooled to room temperature and then filtered, obtaining the product as filter cake. The cake is washed with diethyl ether or acetone and then dried yielding an anhydride of phenyloctyl di(methylphosphonyl) phosphine oxide.

EXAMPLE 18

Into a suitable vessel such as described in Example 1 above, are charged about 425 parts of phenyltetradecyl di(methylphosphonyl) phosphine oxide and about 280 parts of acetic anhydride. The reaction mixture is stirred so as to achieve a good dispersion of the acid in the anhydride and then heated at reflux temperatures (125–135° C.) for about 10 hours under stirring. The reaction batch is cooled to room temperature and then filtered obtaining the product as filter cake. The cake is washed with diethyl ether or acetone and then dried yielding an anhydride of phenyltetradecyl di(methylphosphonyl) phosphine oxide.

EXAMPLE 19

Into a suitable vessel such as described in Example 1 above, are charged about 320 parts of phenylethyl di-(methylphosphonyl) phosphine oxide and about 280 parts of acetic anhydride. The reaction mixture is stirred so as to achieve a good dispersion of the acid in the anhydride and then heated at reflux temperatures (125–135° C.) for about 6 hours under stirring. The reaction batch is cooled to room temperature and then filtered, obtaining the product as filter cake. The cake is washed with diethyl ether or acetone and then dried yielding an anhydride of phenylethyl di(methylphosphonyl) phosphine oxide.

EXAMPLE 20

Into a suitable vessel such as described in Example 1 above, are charged about 400 parts of chloroacetic anhydride and about 438 parts of oleyl di(methylphosphonyl) phosphine oxide. The reaction mixture is stirred so as to achieve a good dispersion of the acid in the anhydride and then heated at temperatures of about 150–160° C. for about 10 hours under stirring. The reaction batch is cooled to room temperature and then filtered, obtaining the product as filter cake. The cake is washed with diethyl ether or acetone and then dried yielding an anhydride of oleyl di(methylphosphonyl) phosphine oxide.

EXAMPLE 21

Into a suitable reaction vessel such as described in Example 1 above, are charged about 15 parts of methyl dodecyl mono(methylphosphonyl) phosphine oxide and about 100 parts of acetic anhydride. The reaction mixture is stirred so as to achieve a good solution of the acid in the anhydride and heated at reflux temperatures (125–135° C.) for about 6 hours under stirring. The unreacted acetic ahnydride and acetic acid are distilled off from the reaction batch yielding a highly viscous, glassy polymeric anhydride of methyl dodecyl mono(methylphosphonyl) phosphine oxide.

EXAMPLE 22

Into a suitable reaction vessel such as described in Example 1 above, are charged about 65 parts of phenyl mono(methylphosphonyl) phosphine oxide and about 100 parts of acetic anhydride. The reaction mixture is stirred so as to achieve a good solution of the acid in the anhydride and heated at reflux temperatures (125–135° C.) for about 6 hours under stirring. The unreacted acetic anhydride and acetic acid are distilled off from the reaction batch yielding a highly viscous, glassy polymeric anhydride of phenyl mono(methylphosphonyl) phosphine oxide.

EXAMPLE 23

Into a suitable reaction vessel such as described in Example 1 above, are charged about 339 parts of dodecyl phenyl ethyl mono(methyl phosphonyl) phosphine oxide and about 260 parts of acetic anhydride. The reaction mixture is stirred so as to achieve a good solution of the acid in the anhydride and heated at reflux temperatures (125–135° C.) for about 8 hours under stirring. The unreacted acetic anhydride and acetic acid are distilled off from the reaction batch yielding a highly viscous, glassy polymeric anhydride of dodecylphenyl ethyl mono(methylphosphonyl) phosphine oxide.

EXAMPLE 24

Into a suitable reaction vessel such as described in Example 1 above, are charged about 171 parts of phenylethyl hexyl mono-(methylphosphonyl) phosphine oxide and about 180 parts of acetic anhydride. The reaction mixture is stirred so as to achieve a good solution of the acid in the anhydride and heated at reflux temperatures (125–135° C.) for about 8 hours under stirring. The unreacted actic anhydride and acetic acid are distilled off from the reaction batch yielding a highly viscous, glassy polymeric anhydride of phenylethyl hexyl mono(methyl phosphonyl) phosphine oxide.

EXAMPLE 25

Into a suitable reaction vessel such as described in Example 1 above, are charged about 223 parts of cyclohexyl mono(methylphosphonyl) phosphine oxide and about 200 parts of acetic anhydride. The reaction mixture is stirred so as to achieve a good solution of the acid in the anhydride and heated at reflux temperatures (125–135° C.) for about 6 hours under stirring. The unreacted acetic anhydride and acetic acid are distilled off from the reaction batch yielding a highly viscous glassy polymeric anhydride of cyclohexyl mono(methylphosponyl) phosphine oxide.

EXAMPLE 26

Into a suitable reaction vessel such as described in Example 1 above, are charged a mixture of about 39 parts of tri(methylphosphonyl) phosphine oxide and about 75 parts of dodecyl di(methylphosphonyl) phosphine oxide. About 130 parts of acetic anhydride are charged to the vessel. The reaction mixture is stirred so as to achieve a good dispersion of the phosphine oxides in the anhydride and then heated at reflux temperatures (125–135° C.) for about 12 hours under stirring. The reaction batch is cooled to room temperature and then filtered, obtaining the product as a filter cake. The cake is washed with acetone and then dried yielding a mixture of an anhydride of tri(methylphosphonyl) phosphine oxide, an anhydride of dodecyl di(methylphosphonyl) phosphine oxide and a polymeric anhydride of tri(methylphosphonyl) phosphine oxide and dodecyl di (methylphosphonyl) phosphine oxide.

EXAMPLE 27

Into a suitable vessel such as described in Example 1 above, are charged about 31 parts of tri(methylphosphonyl) phosphine oxide and about 50 parts of acetic acid. The reaction mixture is stirred so as to achieve a good dispersion of the phosphine oxide in the acetic acid and then heated to reflux (125–135° C.) under stirring. While refluxing about 50 parts of acetyl chloride are added sub-surface to the reaction batch at a rate such that the addition takes about 1 to 2 hours. Refluxing is continued for about 1 hour and then the reaction batch is cooled to room temperature. The reaction batch is filtered obtaining about 20 parts of the product as filter cake. The cake is washed with acetone and then dried yielding an anhydride of tri(methylphosphonyl) phosphine oxide.

In order to demonstrate one utility of the present invention phosphine oxide anhydrides, approximately 100 grams of each of the phosphine oxide anhydrides prepared and described in the foregoing Examples 1–27 is separately and individually mixed with an inert solvent in a 500 ml. breaker, in this case carbon tetrachloride, in order to prepare a 10% by weight (solution or) slurry of each anhydride. After the 27 separate slurries are prepared, a separate and individual swatch of a 3″ x 3″ undyed cotton cellulose is intimately contacted with each slurry by submerging such swatch in the slurry for approximately 3 minutes. The 27 separate swatches are withdrawn from the breakers containing these slurries (or solutions) and are dried for 10 minutes in an oven which is maintained at a temperature of approximately 80° C. After a lapse of 10 minutes at 80° C., the temperature is elevated and the swatches are then subjected to a temperature of approximately 150° C. for approximately 5 minutes in order to "set up" a reaction between the specific phosphine oxide anhydride with the hydroxy groups on the cotton cellulose surface. The dried 27 swatches of "treated" cotton are individually tested for flame retardancy by positioning a swatch over a Bunsen burner. The flame is adjusted to a point at which the tip of the the removal of the Bunsen burner away from the cotton flame is approximately 1 inch beneath the cotton swatch. An untreated cotton swatch is used as a control for comparative purposes. The flame underneath each of the individual cotton swatches (including the control) is maintained for approximately 30 seconds and then is removed. Visual observations are made. The results of this test show that the control sample, i.e. the cotton swatch which was not treated with any phosphine oxide anhydride, is completely destroyed. However, with each of the 27 treated cotton swatches, there is primarily only charring, and the flame on the material is self-extinguishing upon the removal of the Bunsen burner away from the cotton swatches. Thus, it can readily be seen that one of the unique applications of the phosphine oxide anhydrides of the present invention is its use as a fire retardant for cellulose material, for example cotton clothing.

Other organo-alkylidene phosphonyl phosphine oxides which can be reacted with an organo carboxylic acid derivative according to procedures as illustrated by the foregoing disclosure and examples include:

Aliphatic hydrocarbyl mono(methylphosphonyl) phosphine oxides, such as, dipropyl-, hexyl methyl, dipropenyl-, oleyl ethyl-, didodecyl-, hexadecyl hexyl-, octenyl propyl-, didecyl mono(methylphosphonyl) phosphine oxide and the like; alkaryl mono(methylphosphonyl)phosphine oxide, such as propyl phenyl ethyl-, butyl phenyl-, decylphenyl butyl, xylyl-, xylyl ethyl-, hexadecylphenyl methyl-mono(methylphosphonyl) phosphine oxide and the like; aralkyl mono(methylphosphonyl) phosphine oxides, such as benzyl-, benzyl methyl-, benzyl hexyl-, phenyl propyl ethyl-, phenylhexyl-, phenylhexadecyl ethyl-, phenyldecyl hexyl-mono(methylphosphonyl)phosphine oxide and the like; aliphatic hydrocarbyl di(methylphosphonyl)phosphine oxides, such as propyl-, butyl, propenyl, octenyl-, tetradecyl-, nonyl-, hexadecyl-, heptyl- di(methylphosphonyl) phosphine oxide, and the like; alkaryl di(methylphosphonyl) phosphine oxides, such as propylphenyl-, butylphenyl-, decylphenyl, xylyl-, octadecylphenyl- octylphenyl-, hexadecylphenyl-, heptylphenyl di(methylphosphonyl) phosphine oxide and the like; aralkyl di(methylphosphonyl) phosphine oxides, such as, benzyl-, phenylpropyl-, phenylbutyl, phenylhexyl-, phenyldecyl-, phenylhexadecyl- di(methylphosphonyl) phosphine oxide and the like; and alkylene poly(methylphosphonyl) polyphosphine oxides, such as, trimethylene tetra(methylphosphonyl) bis(phosphine oxides), hexamethylene tetra (methylphosphonyl) bis(phosphine oxide), heptamethylene tetra(methylphosphonyl) bis(phosphine oxide), decamethylene tetra(methylphosphonyl) bis(phosphine oxide), ethylene tri(methylphosphonyl) bis(phosphine oxide), ethylene penta(methylphosphonyl) tris(phosphine oxide), propylene tetra(methylphosphonyl) bis(phosphine oxide) triethylene hexa(methylphosphonyl) tetrabis(phosphine oxide), pentaethylene octa(methylphosphonyl) hexa-bis(phosphine oxide), pentaethylene tetra (methylphosphonyl) hexazis(phosphine oxide), and compounds of the following:

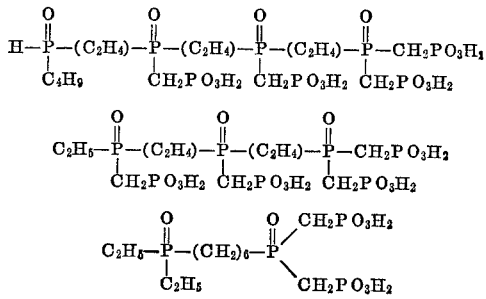

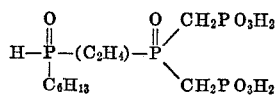

What is claimed is:
1. An anhydride of tri(lower alkylidene phosphonyl) phosphine oxide having the formula:

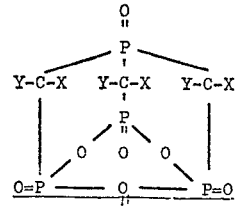

wherein X and Y are selected from the group consisting of hydrogen and alkyl groups containing from 1 to 6 carbon atoms.

2. An anhydride according to claim 1, wherein X and Y are both hydrogen and having the formula:

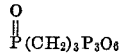

References Cited
UNITED STATES PATENTS
2,787,629   4/1957   Coover et al.   260—461
3,176,036   3/1965   McKaiyama et al.   260—461

OTHER REFERENCES
Medved et al. Izvest AKAD Navk SSR 1968, 2002.

LORRAINE A. WEINBERGER, Primary Examiner
R. GERSTL, Assistant Examiner

U.S. Cl. X.R.

8—116 P; 117—137; 252—8.1; 260—2 P, 502.4 P, 551 P, 606.5 P, 932